(12) United States Patent
Bognar

(10) Patent No.: US 10,532,800 B2
(45) Date of Patent: Jan. 14, 2020

(54) THERMAL HYDROGEN GENERATOR USING A METAL HYDRIDE AND THERMITE

(71) Applicant: John A. Bognar, Belgrade, MT (US)

(72) Inventor: John A. Bognar, Belgrade, MT (US)

(73) Assignee: Anasphere, Inc., Belgrade, MT (US)

(*) Notice: Subject to any disclaimer, the term of this patent is extended or adjusted under 35 U.S.C. 154(b) by 182 days.

(21) Appl. No.: 15/265,486

(22) Filed: Sep. 14, 2016

(65) Prior Publication Data

US 2017/0001700 A1    Jan. 5, 2017

Related U.S. Application Data

(62) Division of application No. 14/029,174, filed on Sep. 17, 2013, now Pat. No. 10,220,930.

(60) Provisional application No. 61/701,721, filed on Sep. 17, 2012.

(51) Int. Cl.
| | |
|---|---|
| B64B 1/62 | (2006.01) |
| G01W 1/08 | (2006.01) |
| B64B 1/58 | (2006.01) |
| C06B 45/00 | (2006.01) |
| C06B 43/00 | (2006.01) |
| B01J 7/00 | (2006.01) |
| C01B 3/04 | (2006.01) |

(52) U.S. Cl.
CPC .................... B64B 1/62 (2013.01); B01J 7/00 (2013.01); B64B 1/58 (2013.01); C01B 3/04 (2013.01); C06B 43/00 (2013.01); C06B 45/00 (2013.01); G01W 1/08 (2013.01)

(58) Field of Classification Search
CPC ................. B64B 1/62; C01B 3/04; B01J 7/00
See application file for complete search history.

(56) References Cited

U.S. PATENT DOCUMENTS

| 7,261,748 B2 | 8/2007 | Jones et al. |
| 7,363,861 B2 | 4/2008 | Brune et al. |
| 7,682,411 B2 | 3/2010 | Jones et al. |
| 2008/0035252 A1* | 2/2008 | Mallery .................... C01B 3/04 149/22 |
| 2014/0044605 A1* | 2/2014 | Langan ...................... B01J 7/00 422/198 |
| 2014/0076043 A1 | 3/2014 | Bognar |

OTHER PUBLICATIONS

"Explosive Safety Standards," U.S. Air Force Manual 91-201, Jan. 12, 2011, retrieved from https://www.wbdg.org/FFC/AF/AFMAN/afman91-201.pdf, 473 pages.
"Hydrogen Generators for Filling Weather Balloons," FigTree Environmental, 2008, retrieved from http://figtree.us.com/proton.htm, 1 page.
"John J. Mooney," Wikipedia, Last updated May 28, 2018, retrieved from https://en.wikipedia.org/wiki/John_J._Mooney, 4 pages.

(Continued)

*Primary Examiner* — Aileen B Felton
(74) *Attorney, Agent, or Firm* — Sheridan Ross P.C.

(57) ABSTRACT

This invention relates to a thermal hydrogen generator and a process and system for generating hydrogen gas, more specifically to a process and system for generating hydrogen gas by thermally decomposing a metal hydride.

10 Claims, 8 Drawing Sheets

(56) References Cited

OTHER PUBLICATIONS

"Lift Gas Cracker," Pioneer Astronautics, 2003, retrieved from http://www.pioneerastro.com/Projects/Lift_Gas_Cracker.html, 2 pages.
Official Action for U.S. Appl. No. 14/029,174, dated Dec. 17, 2015, 7 pages. Restriction Requirement.
Official Action for U.S. Appl. No. 14/029,174, dated Jul. 28, 2016, 6 pages.
Official Action for U.S. Appl. No. 14/029,174, dated Dec. 28, 2016, 6 pages.
Notice of Allowance for U.S. Appl. No. 14/029,174, dated Apr. 17, 2018, 5 pages.

* cited by examiner

THERMAL HYDROGEN GENERATOR USING A METAL HYDRIDE AND THERMITE

CROSS REFERENCE TO RELATED APPLICATION

The present application is a divisional of U.S. patent application Ser. No. 14/029,174, filed Sep. 17, 2013, which claims the benefits of U.S. Provisional Application Ser. No. 61/701,721, filed Sep. 17, 2012, both entitled "Thermal Hydrogen Generator Using a Metal Hydride and Thermite", which is incorporated herein by this reference in its entirety.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. FA9302-12-M-0001 awarded by the United States Air Force.

TECHNICAL FIELD

This invention relates to a thermal hydrogen generator and a process and system for generating hydrogen, more specifically to a process and system for generating hydrogen by thermally decomposing a metal hydride.

BACKGROUND OF INVENTION

Present methods to gather in-situ meteorological data include launching conventional balloon-borne rawinsondes, launching dropsondes from specially-equipped aircraft, using a calibrated pacer air vehicle, or flying specific flight patterns. The major drawbacks affecting these approaches can include spatial inaccuracy (in the case of balloon-borne or falling sensors), asset availability (in the case of dedicated measurement aircraft), and simple inefficiency. An in-situ radiosonde system capable of deployment from nearly any military aircraft would solve the problems of spatial inaccuracy, asset availability and simple inefficiency by allowing for the spatially and temporally precise deployment of sensors in the test airspace without placing any undue burden on other range assets or requiring additional flight time from the test aircraft.

One solution involves a system that is compatible with a countermeasures dispensing system and flare magazine that employ components common with current decoys and that follow the same trajectory upon deployment. These systems would be capable of operation as either a dropsonde or upsonde (rawinsonde), enabling measurements above or below the launch aircraft flight path; measure meteorological variables including pressure, temperature, relative humidity, and winds (the latter via GPS); and return data via one or more data link paths to either aircraft- or ground-based receivers.

The system would thus include an easily-deployed sonde which can either fall below (dropsonde) or rise above (upsonde) the flight path of the deploying aircraft, such as an F-16. Aircraft-based deployment ensures timely and spatially precise deployment of sensors. Furthermore, by using common countermeasures systems as the deployment mechanism, readily available chase aircraft can be used to gather the meteorological data immediately before a test.

Several challenges are faced in the deployment of sondes from countermeasure dispensing systems. The first challenge is that countermeasure systems are small due to the limited space on military aircraft. Another challenge in the development of a upsonde system is the necessity of being able to rapidly fill a balloon, such as a weather balloon, with hydrogen gas ($H_2$) so that the upsonde can begin rising immediately after being deployed from the aircraft.

Hydrogen gas ($H_2$) is the gas of choice for filling sondes. There are many ways to form hydrogen gas, and the selection of the gas generation method can depend on the specific application for which the gas is being generated. While few applications have a need to generate the gas quickly and from a housing as small as the countermeasures system, there is still another application with strict constraints, namely man-portable applications. There are many remote areas in the world where it is impractical or impossible to transport hydrogen or helium cylinders, or set up hydrogen generators. Furthermore, in some cases, a single person may be charged with launching meteorological balloons from areas reached only on foot or by parachuting into a location. In such a situation, the most compact and light-weight hydrogen generator possible is required.

Several hydrogen-generating technologies have been considered for the rapid generation of hydrogen gas, particularly for use in meteorological balloons.

The electrolysis of water can generate hydrogen to fill balloons. Key disadvantages of this approach include the need for external electrical power, pure water, size and weight of the equipment, and the relatively slow rate of the electrolytic reaction. A remote electrolysis system would require batteries and water to generate hydrogen gas to fill a balloon.

Methanol can be catalytically reformed, usually in the presence of water, to produce a mixture of hydrogen and either carbon monoxide or carbon dioxide. The resulting gas can be used as-is or the hydrogen can be separated to fill a meteorological balloon. Disadvantages of this approach include the size and weight of the equipment, and the need for precise thermal control of the catalytic reactor. The catalytic reaction occurs at about 230 degrees Celsius, which is a reasonable temperature to achieve. However, several problems present themselves with regard to a miniaturized approach, including maintaining the catalyst conditioning in storage (such as, kept under a hydrogen atmosphere), having a large enough reactor bed to achieve sufficiently fast hydrogen generation, driving a methanol/water solution through the reactor bed, and preheating the methanol/water solution to a vapor at 230 degrees Celsius.

Ammonia can be catalytically decomposed to yield hydrogen and nitrogen; this approach has been used for generating hydrogen at remote sites because it is easier to ship ammonia than hydrogen. Key disadvantages of this approach include size and weight of the equipment, as well as the comparatively demanding need to store ammonia in liquid forms in cases where volume is at a premium. Furthermore, catalytic decomposition of ammonia to nitrogen and hydrogen was examined, but either requires high temperatures (approximately 350 degrees Celsius) or relies on novel, still-experimental catalysts active at lower temperatures.

What is needed is a method and system that can generate hydrogen gas very quickly and fit in a very small volume. While methods to simply generate hydrogen gas are many, none of the systems can generate hydrogen gas rapidly from a lightweight, small volume system.

SUMMARY

Embodiments and configurations of the present invention can address these and other needs.

The present disclosure can include a device having a first compartment containing a pyrotechnic composition, a second compartment containing a metal hydride, and a separator in thermal contact with the first and second compartments. The first and second compartments can separately and individually comprise one of steel, aluminum, ceramic, or other heat-resistant materials alone or in combination.

The pyrotechnic composition can be a mixture of a powder metal oxide and a powder metal. The powder metal oxide can be selected from the group consisting essentially of iron (III) oxide ($Fe_2O_3$), iron (II,III) oxide ($Fe_3O_4$), copper (I) oxide ($Cu_2O$), copper (II) oxide (CuO), tin (IV) oxide ($SnO_2$), lead (IV) oxide ($PbO_2$), manganese (IV) oxide ($MnO_2$), manganese (III) oxide ($Mn_2O_3$), chromium (III) oxide ($Cr_2O_3$), cobalt (II) oxide (CoO), nickel (II) oxide (NiO), and vanadium (V) oxide ($V_2O_5$), and mixtures thereof. In some configurations, the powder metal is aluminum (Al), and in other configurations the powder metal may be magnesium (Mg) or zinc (Zn). In some configurations, the powder metal is selected from the group consisting of aluminum (Al), magnesium (Mg), zinc (Zn), and combinations and composites thereof.

The separator can transfer thermal energy generated in the first compartment by reaction of the pyrotechnic composition to the second compartment. The separator can be comprised of steel or another heat-resistant, thermally conductive material, or alternatively ceramic or another heat-resistant, thermally insulating material as long as a separate heat transfer path is provided.

At least some of the thermal energy can be transferred to the second compartment, thereby thermally decomposing at least some of the metal hydride to release hydrogen gas. The metal hydride can be selected from the group consisting essentially of lithium aluminum hydride ($LiAlH_4$), sodium aluminum hydride ($NaAlH_4$), potassium aluminum hydride ($KAlH_4$), lithium borohydride ($LiBH_4$), sodium borohydride ($NaBH_4$), potassium borohydride ($KBH_4$), lithium hydride (LiH), sodium hydride (NaH), potassium hydride (KH), magnesium hydride ($MgH_2$), calcium hydride ($CaH_2$) and mixtures thereof. In some applications, the device can release, in no more than about 60 seconds, more than about 4.6 moles of hydrogen gas per liter of the device volume. In other applications, it can release, in no more than about 60 seconds, about 6.2 moles of hydrogen gas per liter of the device volume, and in yet still other applications it can release more than about 7.3 moles of hydrogen gas per liter of the device volume. In some applications, it can release, in no more than about 60 seconds, about 9.7 moles of hydrogen gas per liter of the device volume. In yet other applications, it can release, in about 300 seconds, from about 4.6 to about 6.2 moles of hydrogen gas per liter of the device volume.

The device can further include an igniter interconnected with the first compartment. The igniter causes the ignition of the pyrotechnic composition. The igniter can cause ignition by one or more of a spark, thermal energy (such as that from a hot wire), flame, or friction. The igniter will typically use the initiation action to ignite a secondary material which burns hot enough to ignite the thermite.

The present disclosure can provide a process for using the device. The process can have the steps of: (a) initiating, in a first compartment, ignition of a pyrotechnic composition comprising powder aluminum and a powder metal oxide to release thermal energy; (b) transferring the released thermal energy from the first compartment to a second compartment containing a metal hydride; and (c) with the thermal energy transferred to the second compartment, initiating the thermal decomposition of the metal hydride to release hydrogen gas.

The transferring step (b) may further include transferring the thermal energy through one or both of a metal and metal-bearing compound. Furthermore, the transferring of the released thermal energy may include an intermediate heat conductor. In some configurations, one or more tungsten rods form the intermediate conductor.

The process can further include cooling the released hydrogen gas.

In some applications, the process can include releasing, in no more than about 60 seconds, more than about 4.6 moles of hydrogen gas per liter of the device volume. In other applications, the process can include releasing, in no more than about 60 seconds, about 6.2 moles of hydrogen gas per liter of the device volume, and in yet other applications more than about 7.3 moles of hydrogen gas per liter of the device volume. In some applications, the process can include releasing, in no more than about 60 seconds, about 9.7 moles of hydrogen gas per liter of the device volume. In yet other applications, the process can include releasing, in about 300 seconds, from about 4.6 to about 6.2 moles of hydrogen gas per liter of the device volume.

The present disclosure can include a sonde device having a balloon; a self-contained hydrogen generator a) interconnected to the balloon, b) configured to inflate the balloon after being launched from a military aircraft, and c) having a thermal separator positioned between and in thermal contact with i) a thermal compartment containing a thermite composition comprising a powder metal oxide and powder aluminum metal, ii) a gas-generating compartment containing a metal hydride, and iii) an igniter configured to ignite the thermite on launch from a conventional decoy flare ignition train of the military aircraft; and a data collection module that is configured to collect data using a microprocessor executable set of instructions on a tangible and non-transient computer readable media for determining one or both of meteorological and terrestrial activities or conditions.

The reaction of the thermite can generate thermal energy. At least some of the thermal energy generated in the thermal compartment by the reaction of the thermite can be transferred to the gas-generating compartment by the thermal separator. In some applications, the thermal separator is a metal sheet. In some applications, the thermal compartment includes a crucible wrapped with a ceramic insulation.

The self-contained hydrogen generator can be configured to inflate the balloon with hydrogen released by thermal decomposition of the metal hydride contained in the gas-generating compartment. Furthermore, the thermite composition can be configured to generate sufficient thermal energy to thermally decompose at least some of the metal hydride and release sufficient hydrogen to inflate the balloon. The metal hydride can be selected from the group consisting essentially of lithium aluminum hydride ($LiAlH_4$), sodium aluminum hydride ($NaAlH_4$), potassium aluminum hydride ($KAlH_4$), lithium borohydride ($LiBH_4$), sodium borohydride ($NaBH_4$), potassium borohydride ($KBH_4$), lithium hydride (LiH); sodium hydride (NaH), potassium hydride (KH), magnesium hydride ($MgH_2$), calcium hydride ($CaH_2$) and mixtures and composites thereof. The powder metal oxide can be selected from the group consisting essentially of iron (III) oxide ($Fe_2O_3$), iron (II,III) oxide ($Fe_3O_4$), copper (I) oxide ($Cu_2O$), copper (II) oxide (CuO), tin (IV) oxide ($SnO_2$), lead (IV) oxide ($PbO_2$), manganese (IV) oxide ($MnO_2$), manganese (III) oxide ($Mn_2O_3$), chromium (III) oxide ($Cr_2O_3$), cobalt (II) oxide (CoO), nickel (II) oxide (NiO), and vanadium (V) oxide ($V_2O_5$), and mixtures thereof. In some configurations, the powder metal is aluminum (Al), and in other configurations the powder metal may be magnesium (Mg) or zinc (Zn). In some configurations, the powder metal is selected from the group of zero-valent metals consisting of aluminum (Al), magnesium (Mg), zinc (Zn), and combinations and composites thereof.

In some configurations, the thermal and gas-generating compartments are stacked one-on-top of another. In other configurations, the thermal and gas-generating compartments are arranged with one partly or completely encased in the other.

The present disclosure can provide a number of advantages depending on the particular configuration. It can provide a method and system that can generate hydrogen gas very quickly and fit in a very small volume. The system can therefore be small and lightweight. The hydrogen-generating system and method is therefore highly beneficial for rapidly filling meteorological balloons.

These and other advantages will be apparent from the disclosure of the aspects, embodiments, and configurations contained herein.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any storage and/or transmission medium that participate in providing instructions to a processor for execution. Such a medium is commonly tangible and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

A device for generating hydrogen gas is described herein. Compared to other hydrogen producing technologies, the device can be more compact and produce hydrogen gas more rapidly.

Figure 1A:
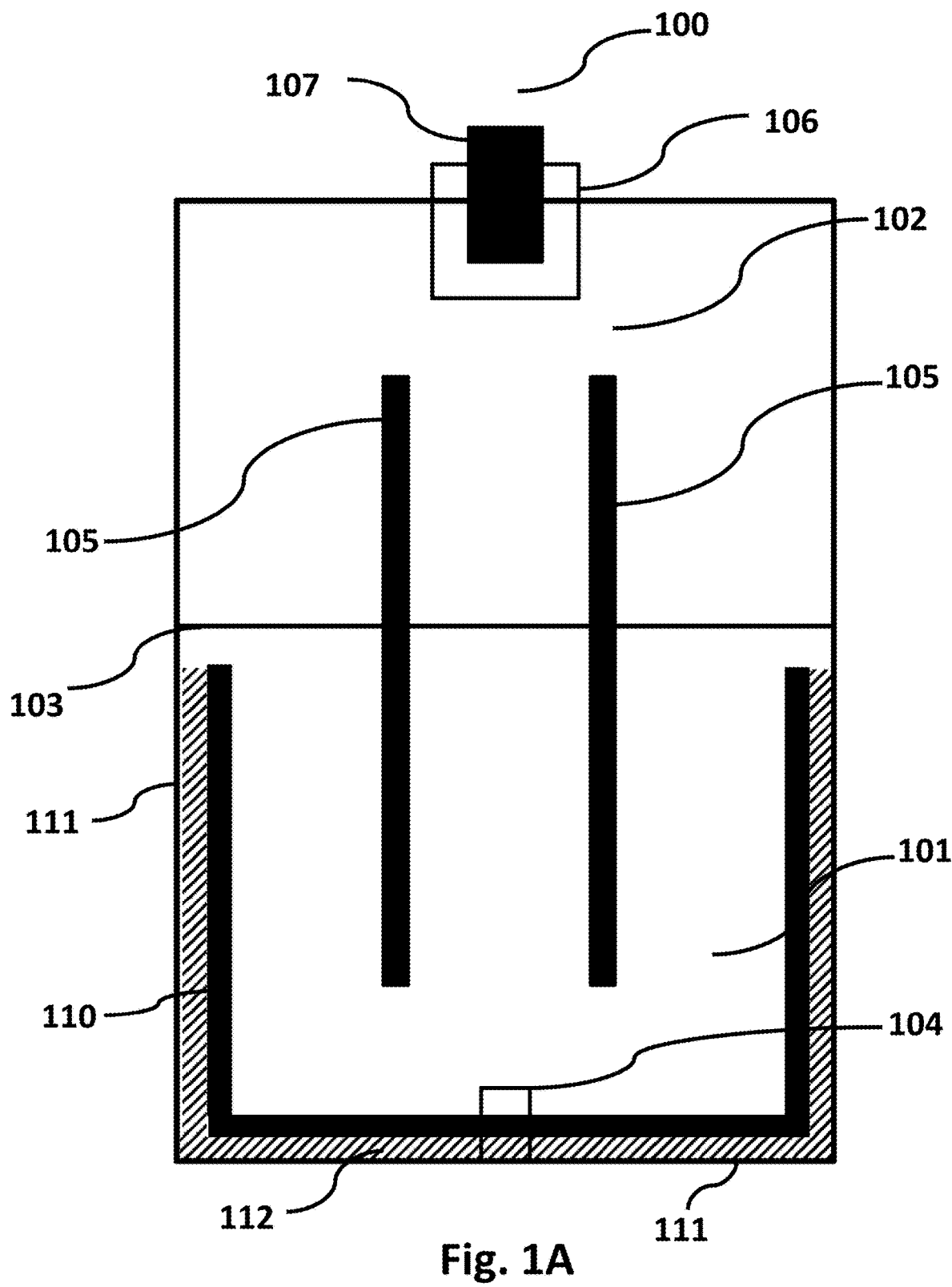
FIGS. 1A and 1B depict a device according to some embodiments of the present disclosure.
Figure 1B:
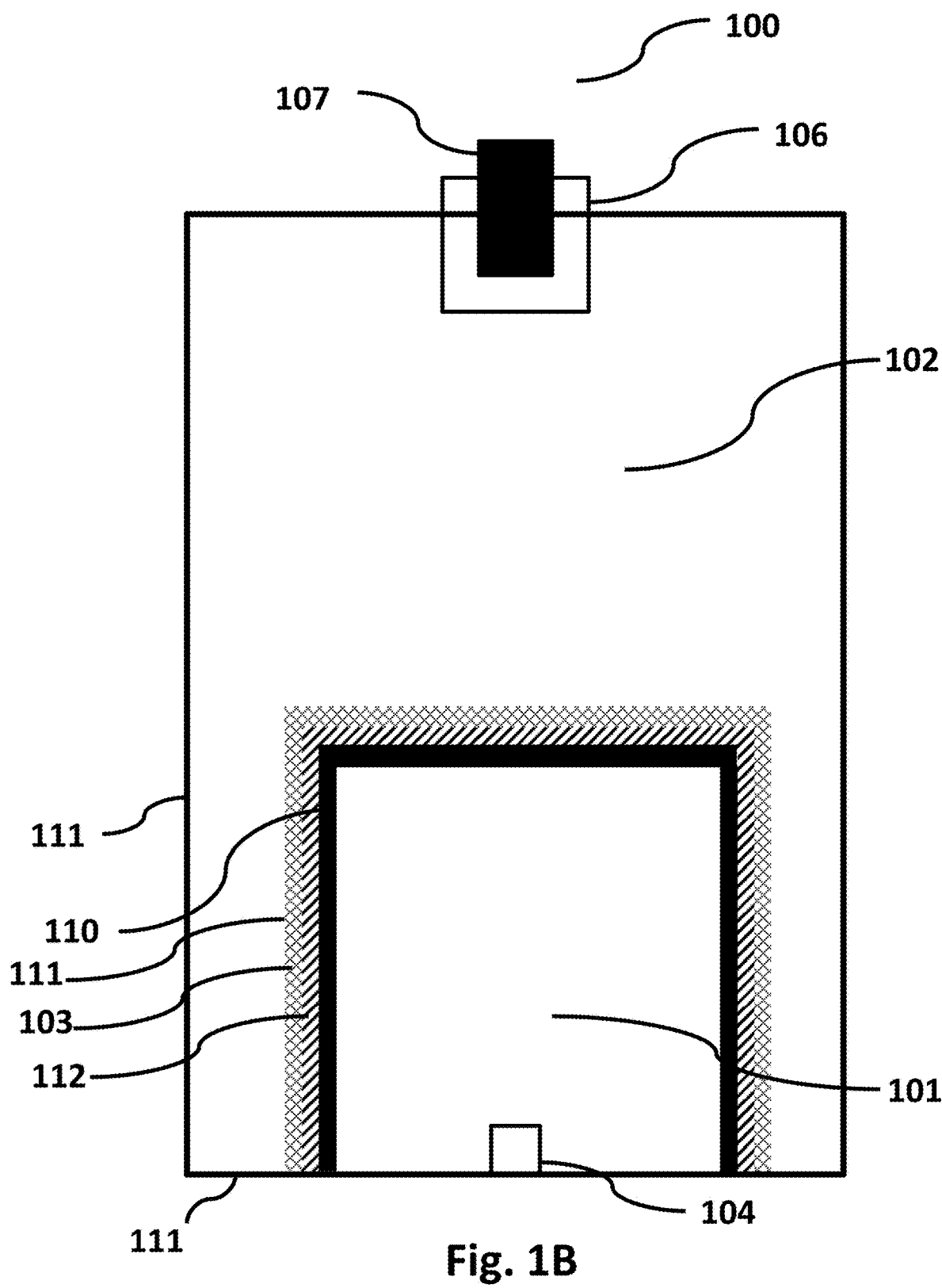

FIGS. 1A and 1B depict non-limiting configurations of a hydrogen generator device 100. The hydrogen generator device 100 comprises a first compartment 101 containing a pyrotechnic composition and a second compartment 102 containing a hydride. The first 101 and second 102 compartments typically have a wall 111 and a separator 103. The separator 103 is in thermal contact with the first 101 and second 102 compartments. Thermal energy generated in the first compartment 101 by reaction of the pyrotechnic composition is transferred to the second compartment 102 by the separator 103, whereby at least some of the thermal energy transferred to the second compartment 102 thermally decomposes at least some of the hydride to release hydrogen gas. Typically, the hydride comprises a metal hydride.

The first 101 and second 102 compartments have first and second compartment volumes, respectively. The hydrogen generator device 100 has a device volume. In some configurations the device volume can be the sum of the first 101 and second 102 compartment volumes. In some configurations, the device volume can be at more than the sum of the first 101 and second 102 compartment volumes. In some configurations, the first 101 and second 102 compartments can be stacked one-on-top of the other as depicted without limitation in FIG. 1A. It can be appreciated that they can be stacked in any order. In other configurations, the first 101 and second 102 compartments can be arranged with one of the compartments partly or completely encased in the other, as for example depicted without limitation in FIG. 1B. One or both of first 101 and second 102 compartments may be comprised of separately and independently, one or more of steel, aluminum, or ceramic.

In some embodiments, the first compartment 101 is configured with one or more vents (not depicted).

In accordance with some embodiments, the first compartment may further comprise a crucible 110. Commonly, the pyrotechnic composition is contained and reacts in crucible 110. The crucible 110 may comprise a metal or ceramic material. Commonly, the crucible 110 comprises one or both of metal and ceramic materials having a melt temperature of more than about 1,900 degrees Celsius. Suitable materials for the separator 103 may comptise steel or other heat-resistant, thermally conductive materials, or alternatively a ceramic or other heat-resistant, thermally insulating material as long as a separate heat transfer path is provided. In some configurations, the first compartment 101 can further include a layer of ceramic insulation 112 positioned between the wall 111 and crucible 110.

The pyrotechnic composition can comprise a powder metal oxide and a powder metal. The powder metal oxide can be selected from the group consisting essentially of iron (III) oxide ($Fe_2O_3$), iron (II,III) oxide ($Fe_3O_4$), copper (I) oxide ($Cu_2O$), copper (II) oxide (CuO), tin (IV) oxide ($SnO_2$), lead (IV) oxide ($PbO_2$), manganese (IV) oxide ($MnO_2$), manganese (III) oxide ($Mn_2O_3$), chromium (III) oxide ($Cr_2O_3$), cobalt (II) oxide (CoO), nickel (II) oxide (NiO), and vanadium (V) oxide ($V_2O_5$), and mixtures thereof. In some configurations, the powder metal is aluminum (Al), and in other configurations the powder metal may be magnesium (Mg) or zinc (Zn).

In one particular configuration, the pyrotechnic composition comprises a mixture of powder ferric oxide and powder aluminum. Those of ordinary skill in the art of pyrotechnics typically refer to this mixture of ferric oxide and aluminum as thermite. The thermite chemical reaction is shown below in chemical equation (1):

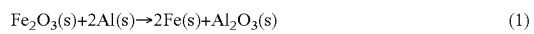
$$Fe_2O_3(s)+2Al(s) \rightarrow 2Fe(s)+Al_2O_3(s) \qquad (1)$$

The thermite chemical reaction is exothermic and releases an immense amount of thermal energy. The thermal energy released by the thermite reaction is so intense that it products an aluminum oxide slag and molten iron. The enthalpy or heat of reaction ($\Delta H°$ value) for the thermite reaction is about −849 kJ (e.g., −849 kJ per mole $Fe_2O_3$). The thermite reaction does not require external oxygen and can, therefore, proceed in locations with limited or no air flow, or even under water. Similar reactions can be performed between aluminum and other iron oxides, copper oxides, manganese oxides, and various other metal oxides. It can be appreciated that in some embodiments, the thermite reaction and similar reactions between a powder metal and a powder metal oxide can occur in the absence of any oxygen or oxidizing substance other than the powder metal oxide(s). Furthermore, the thermite reaction does not produce any gases which might carry away some of the heat of the reaction or produce an explosive excess of pressure.

It can be appreciated that the pyrotechnic composition can generate immense amounts of thermal energy per mass of the pyrotechnic composition. A compact thermal energy generating system can be achieved by having such an immense amount of thermal energy per mass of the pyrotechnic composition. Furthermore, substantially most of heat generated remains available for use since gaseous byproducts are not produced; that is, most of the heat is retained in the liquid and/or solid reaction products as a source of thermal energy. Another way of showing the advantages of having a high temperature (thermal energy) per mass can be found through an analysis of the following equation:

$$Q=mc\Delta T \qquad (2)$$

where Q is thermal energy, $\Delta T$ is the temperature change, m is mass of material undergoing the temperature, and c is the heat capacity of the material undergoing the temperature change. So, to minimize the mass of material (the pyrotechnic composition and/or is reaction byproducts) and implicitly the volume of the device, the only factor available to increase the heat of thermal energy available (Q) to the system (the device) is to increase $\Delta T$ as the heat capacity (c) of the system is assumed to be constant or at least not adjustable over a meaningfully variable range. That, in turn, means a high starting temperature is very beneficial. An additional benefit of a high starting temperature is that heat transfer rate is directly proportional to temperature difference. Higher temperatures will lead to faster heat transfer, which in turn leads to faster decomposition reactions and hydrogen production.

Typically, at least some of the thermal energy transferred to the second compartment 102 by the separator 103 thermally decomposes some of the metal hydride contained in the second compartment 102. The thermal decomposition of the metal hydride releases hydrogen gas. More specifically, the thermal decomposition of the metal hydride chemically converts at least some, if not at least most, of the hydrogen contained in the metal hydride to hydrogen gas. By way of non-limiting example, lithium aluminum hydride (LiAlH$_4$) can be thermally decomposed in a series of reactions to yield hydrogen gas:

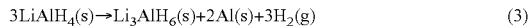

$$3LiAlH_4(s) \rightarrow Li_3AlH_6(s) + 2Al(s) + 3H_2(g) \qquad (3)$$

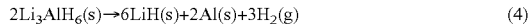

$$2Li_3AlH_6(s) \rightarrow 6LiH(s) + 2Al(s) + 3H_2(g) \qquad (4)$$

$$2LiH(s) + 2Al(s) \rightarrow 2LiAl + H_2(g) \qquad (5)$$

The reactions depicted by chemical equations 3, 4 and 5, respectively, occur in the range of 150-175 degrees Celsius, with a ΔH° value of +9.79 kJ (experimental), at about 200° C., with a ΔH° value of +94.32 kJ (experimental), and at about 400 degrees Celsius, with a ΔH° of no more than about +181 kJ (based thermodynamic calculations). It can be appreciated that the greater the reaction temperature the greater the conversion of the hydride to hydrogen gas.

Generally, at least about 10 mole % of the hydrogen in the form of a hydride contained in the metal hydride is converted to hydrogen gas. More generally, at least 20 mole %, even more generally at least about 30 mole %, yet even more generally at least about 40 mole %, still yet even more generally at least about 50 mole %, still yet even more generally at least about 60 mole %, still yet even more generally at least about 70 mole %, still yet even more generally at least about 80 mole %, still yet even more generally at least about 90 mole %, still yet even more generally at least about 95 mole %, or yet still even more generally at least about 99 mole % of the hydrogen in the form of a hydride contained in the metal hydride is converted to hydrogen gas. Commonly, at least about 80 mole % of the hydrogen in the form of a hydride contained in the metal hydride is converted to hydrogen gas.

While not wanting to be limited by these examples, the hydrogen-generating device commonly generates, in no more than about 60 seconds, more than about 4.6 moles of hydrogen gas per liter of the device volume. More commonly, the hydrogen-generating device commonly generates, in no more than about 60 seconds, more than about 7.3 moles of hydrogen gas per liter of the device volume. According to some configurations, the hydrogen-generating device typically generates, in no more than about 60 seconds, from about 6.2 to about 9.7 moles of hydrogen gas per liter of the device volume. Moreover, in accordance with some configurations, the hydrogen-generating device typically generates, in about 300 seconds, from about 4.6 to about 6.2 moles of hydrogen gas per liter of the device volume. It can be appreciated that there is no need to control one or both of the temperature or thermal energy transfer within the device 100. As a result, the device 100 can be configured to transfer thermal energy rapidly between the first 101 and second 102 compartments, thereby decomposing the metal hydride to release hydrogen gas more rapidly than current hydrogen generation systems. Moreover, the device 100 can be more easily constructed and operated than other hydrogen generators. As for example, there is no need to have the metal hydride reaction occur at any specific temperature, so neither reaction of the pyrotechnic composition nor the transfer of thermal energy from the first 101 to the second 102 compartment is regulated. This is in contrast to catalytic decomposition methods, which require the catalyst to be operated at specific temperatures, pressures, and reactant flow rates.

The gas generator was designed to require only the first two reactions to go to completion with the result that only temperatures of approximately 200 degrees Celsius would need to be reached. Any excess heat reaching the system will simply cause the temperature to rise, and potentially induce the formation of some excess hydrogen via above reaction 5.

Returning to the separator 103, the separator 103 can pass at least most of the thermal energy generated in the first compartment to the second compartment. Commonly, the separator 103 transfers more than about 30% of the thermal energy generated by reaction of the pyrotechnic composition. More commonly, it transfers more than about 40% of the thermal energy, even more commonly more than about 50% of the thermal energy, yet even more commonly more than about 65% of the thermal energy, still yet even more commonly more than about 75% of the thermal energy, still yet even more commonly more than about 85% of the thermal energy, or yet still even more commonly more than about 95% of the thermal energy generated by reaction of the pyrotechnic composition.

The separator 103 can comprise any metal or ceramic material having a melt temperature more than about 1,000 degrees Celsius. Typically, the separator 103 has a melt temperature more than about 1,500 degrees Celsius, more typically a melt temperature more than 1,900 degrees Celsius. Suitable materials for the separator 103 may comprise steel or another heat-resistant, thermally conductive material, or alternatively ceramic or another heat-resistant, thermally insulating material as long as a separate heat transfer path is provided.

In accordance with some embodiments, such as where the separator 103 is fabricated from a thermal insulator, the separator 103 may include an intermediate thermal energy conductor 105. The intermediate thermal energy conductor 105 can transfer at least some the released thermal energy from the first compartment 101 to a second compartment 102. Typically, the intermediate thermal energy conductor 105 comprises one or more of rods, vanes, blades, fins, and bars. Commonly, the intermediate thermal energy conductor 105 traverses through the separator 103 with one distal end of extending into the first compartment 101 and the other distal end extending into the second compartment 102. Suitable materials for the intermediate thermal energy conductor 105 can include tungsten and tungsten carbide. In some configurations, the intermediate thermal energy conductor 105 comprises one or more tungsten carbide rods. While not wanting to be bound by any particular example, the thermal energy conductor 105 has a melting point higher than 2,200K (1,927 degrees Celsius), and a high thermal conductivity of more than about 100-200 W/m-K. In accordance with some configurations, the thermal energy conductor 105 has a thermal conductivity of more than about 200 W/m-K.

The hydrogen generator device 100 may further include an igniter 104 interconnected with the first compartment. The igniter 104 causes the ignition of the pyrotechnic composition. In some configurations, a spark generated within the igniter 104 initiates the ignition process. In other configurations, the ignition process is initiated by thermal energy generated within the igniter 104. The thermal energy provided within igniter 104 may be from a hot wire. In other configurations, the initiating energy within igniter 104 may be from flame. In other configurations, the initiating energy within the igniter 104 may be provided by friction. In accordance with some embodiments, the igniter 104 may comprise a bore-rider pin and ignition pellet utilized in some flare technologies. Details of the bore-rider switch and ignition pellet are described in U.S. Pat. No. 7,363,861, which is incorporated herein by this reference in its entirety.

The igniter 104 may further comprise an ignition aperture in the first compartment 101. The ignition aperture may be configured with a safety-delay switch system.

The hydrogen generator device 100 may further include a heat exchanger 106 interconnected with the second compartment 102. The heat exchanger 106 is configured to cool the hydrogen gas released from the hydride. In accordance with some embodiments, the heat exchanger 106 is interconnected to outlet 107 of the second compartment 102. The exchanger 106 cools the hydrogen gas exiting the second compartment 102 through outlet 107.

The sonde device can include a data collection module that is configured to collect data for determining one or both of meteorological and terrestrial activities or conditions.

The sonde device can include a data collection module that is configured to collect data using a microprocessor executable set of instructions stored on a tangible and non-transient computer readable media for determining one or both of meteorological and terrestrial activities or conditions. The data collection module can be located on the balloon sonde and configured to transmit the sensed information and results to a base unit. Alternatively, it could be located in the base unit and be in wireless communication with one or more sensors on the balloon sonde. Measured events or sensed information can include atmosphere; temperature, air pressure, water vapor, and spatial position with the processed data derived therefrom being, for example, the gradients and interactions of each event and how the event(s) change(s) in time. Techniques to process data are well known in the disciplines of atmospheric science (e.g., meteorology, climatology, atmospheric chemistry) and hydrology and the interdisciplinary fields of hydrometeorology and ocean-atmosphere studies, among others. The sensor(s) used to collect the sensed information can include a hygrometer, thermometer, barometer, and satellite positioning system receiver.

Figure 2:
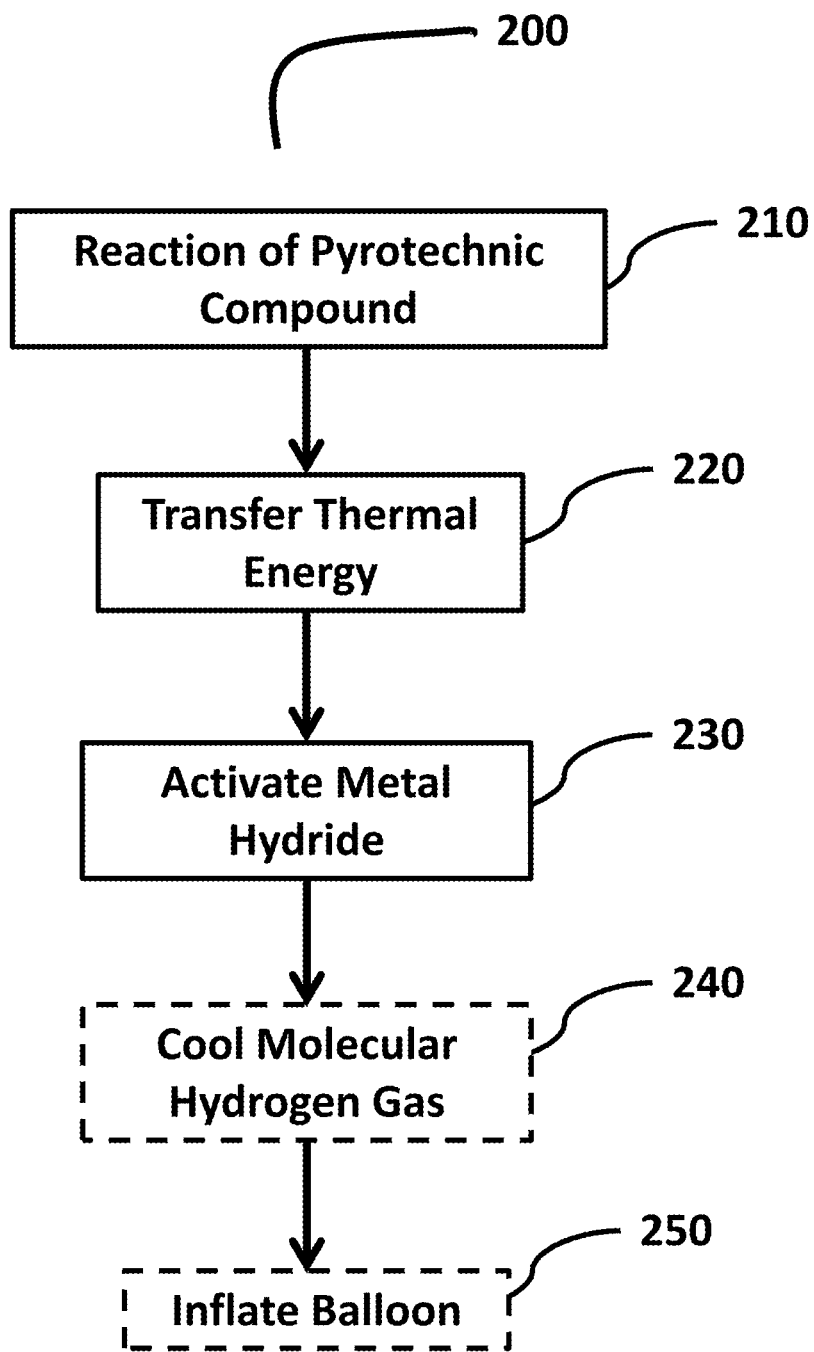
FIG. 2 depicts a process according to some embodiments of the present disclosure.

FIG. 2 depicts a process 200 for using the hydrogen generator device 100.

In step 210, reaction of a pyrotechnic composition is initiated in a first compartment 101. The reaction releases thermal energy. The pyrotechnic composition comprises powder aluminum and powder metal oxide. Non-limiting examples of the powder metal oxide can be selected from the group consisting essentially of iron (III) oxide ($Fe_2O_3$), iron (II,III) oxide ($Fe_3O_4$), copper (I) oxide ($Cu_2O$), copper (II) oxide (CuO), tin (IV) oxide ($SnO_2$), lead (IV) oxide ($PbO_2$), manganese (IV) oxide ($MnO_2$), manganese (III) oxide ($Mn_2O_3$), chromium (III) oxide ($Cr_2O_3$), cobalt (II) oxide (CoO), nickel (II) oxide (NiO), and vanadium (V) oxide ($V_2O_5$), and mixtures thereof. Non-limiting examples of the powder metal can be selected from the group consisting of aluminum (Al), magnesium (Mg) or zinc (Zn).

Step 210 may further include contacting the pyrotechnic composition with an igniter to initiate the reaction. In some configurations the reaction may be initiated by contacting the igniter with one of a hot wire or a spark. In other configurations, flame may initiate the reaction of the pyrotechnic composition via the igniter. In yet other configurations, friction may initiate reaction of the pyrotechnic composition via the igniter. In yet other configurations, a conventional decoy flare ignition train ignites the reaction of the pyrotechnic composition. That is, the sequencer, ignition pellet, and first fire coat as used for conventional MJU-10 flares can be used to ignite the reaction. This puts the ignition of the reaction under the identical timing and control of a regular flare process, greatly improving reliability, consistency, and safety.

In step 220, the energy released by the reaction of the pyrotechnic composition is transferred the first compartment 101 to a second compartment 102. A metal hydride is contained in the second compartment. Non-limiting examples of the metal hydride may be selected from the group consisting of lithium aluminum hydride ($LiAlH_4$), sodium aluminum hydride ($NaAlH_4$), potassium aluminum hydride ($KAlH_4$), lithium borohydride ($LiBH_4$), sodium borohydride ($NaBH_4$), potassium borohydride ($KBH_4$), lithium hydride (LiH); sodium hydride (NaH), potassium hydride (KH), magnesium hydride ($MgH_2$), calcium hydride ($CaH_2$) and mixtures and composites thereof.

In step 230, the thermal energy transferred to the second compartment 102 decomposes the metal hydride to release hydrogen gas. The hydrogen gas is commonly released at rate of more than about 4.6 moles of hydrogen gas per liter of the device volume per minute. More commonly, the hydrogen-generating device commonly releases more than about 7.3 moles of hydrogen gas per liter of the device volume per minute. According to some embodiments, the hydrogen-generating device typically releases, in less than one minute, from about 6.2 to about 9.7 moles of hydrogen gas per liter of the device volume. Moreover, in accordance with some configurations, the hydrogen-generating device typically releases from about 4.6 to about 6.2 moles of hydrogen gas per liter of the device volume per 300 seconds.

Step 230 may further include transferring the released thermal energy from the first compartment 101 to the second compartment 102 through a separator 103. Moreover, some embodiments may further include transferring at least some of the released thermal energy from the first compartment 101 to a second compartment 102 through an intermediate thermal energy conductor 105. In some configurations, the intermediate thermal energy conductor 105 comprises one or more tungsten carbide rods.

In optional step 240, the released hydrogen gas is cooled. The released hydrogen gas may be cooled by a heat exchanger.

In optional step 250, the released gas may be used for one of: inflation of a meteorological balloon; inflation of other types of balloons; inflation of a blimp; inflation of an inflatable article; or pressurization of a gas storage cylinder.

Figure 3A:
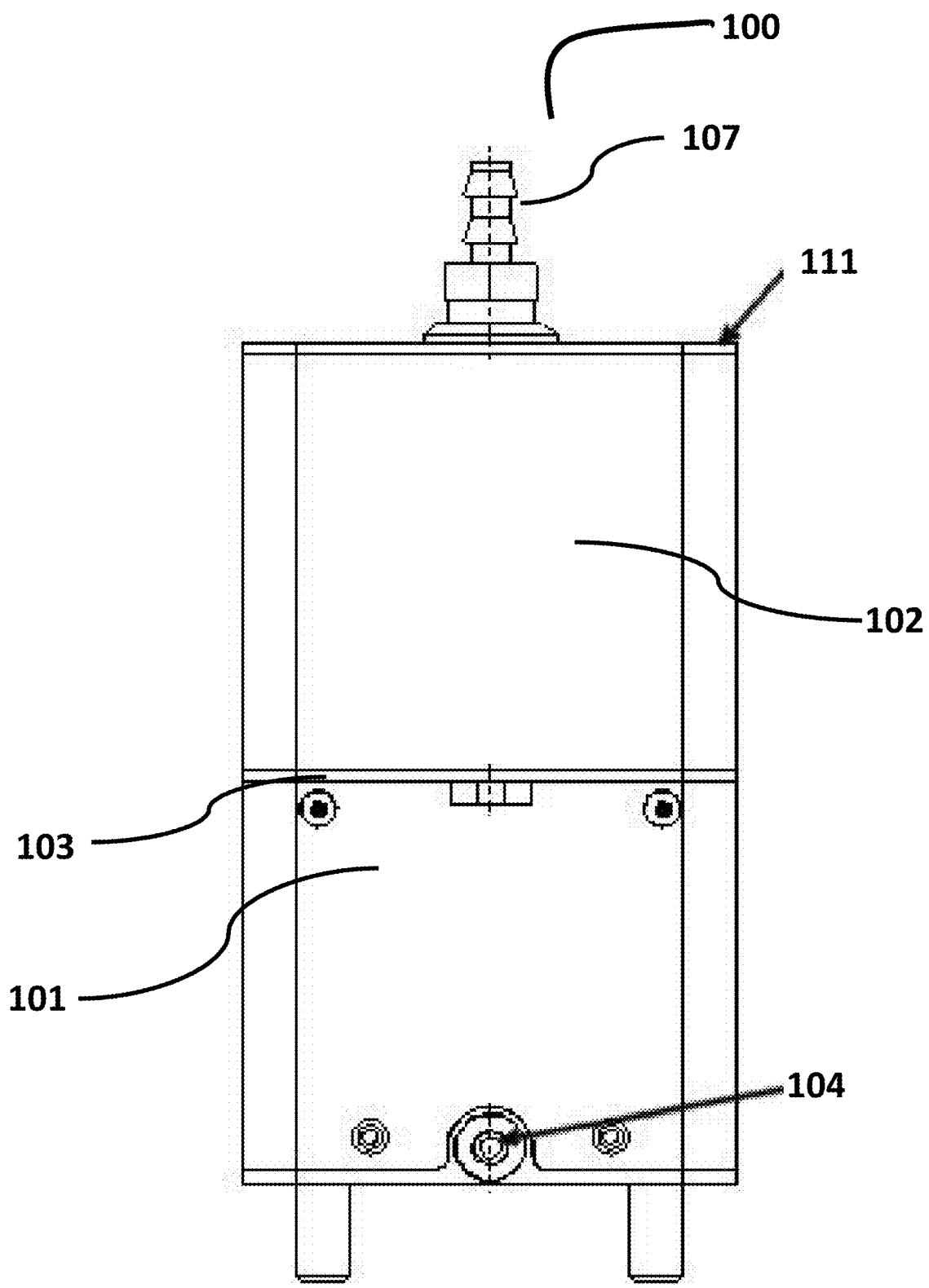
FIGS. 3A and 3B depict another device for generating hydrogen gas according to some embodiments of the present disclosure.
Figure 3B:
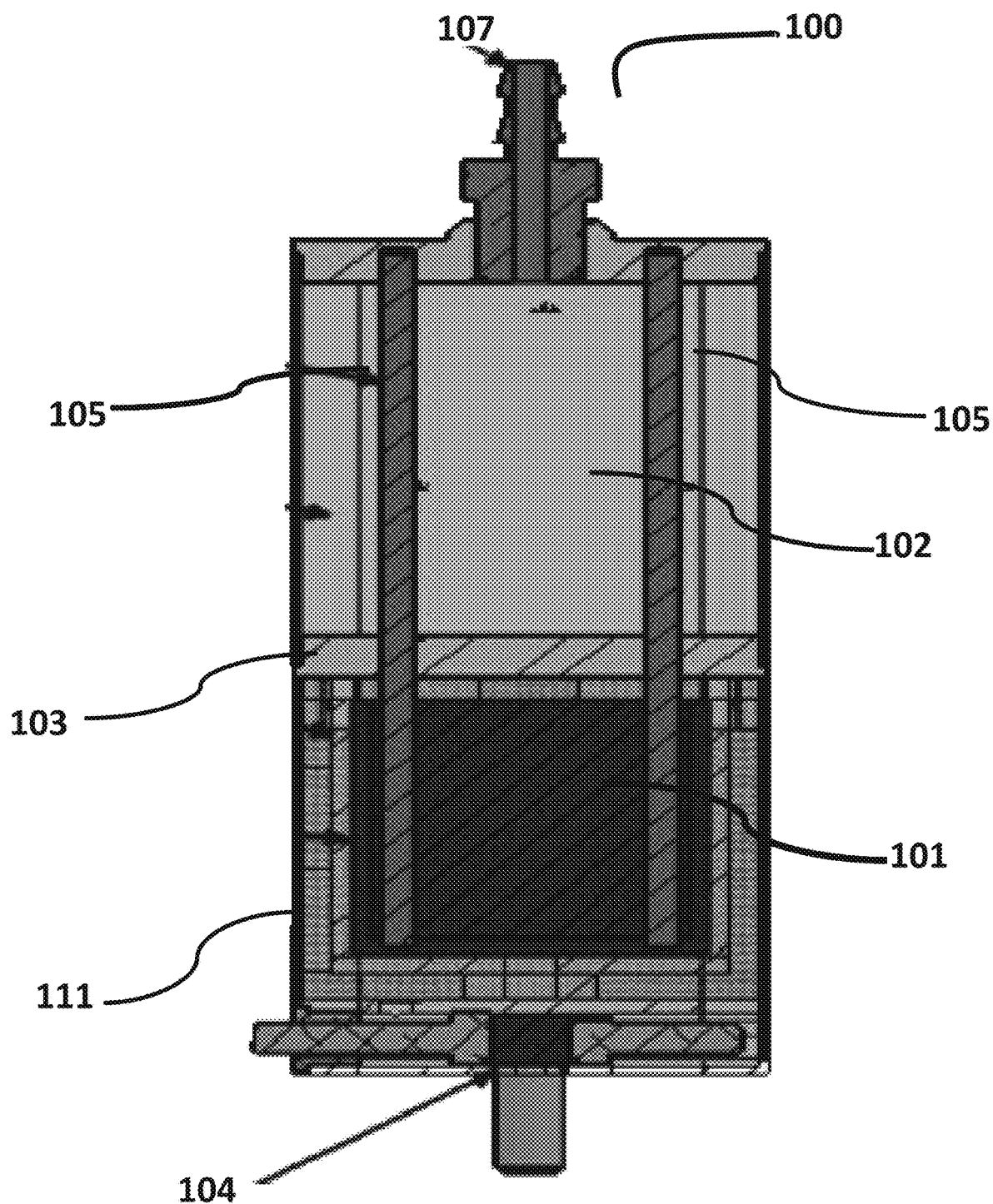

FIGS. 3A and 3B depict a device for generating hydrogen gas according to various embodiments as described in the above Summary and Detailed Description and herein below. More specifically, FIGS. 3A and 3B depict a device 100 having first 101 and second 102 compartments stacked one-on-top of another. The first 101 and second 102 compartments have walls 111 and are separated by separator 103. The separator 103 is in thermal contact with the first 101 and second 102 compartments. The first compartment contains a pyrotechnic composition (not depicted) and the second compartment 102 contains a metal hydride (not depicted). An igniter 104 is interconnected with the first compartment 101. The igniter 104 initiates reaction of the pyrotechnic composition. The device 100 may further include an outlet 107 for the egress of hydrogen gas generated in the second compartment 102. The outlet 107 is interconnected with the second compartment 102. FIG. 3B further depicts intermediate thermal energy conductors 105 traversing through the separator 103 with one distal end of the thermal energy conductor 105 extending into the first compartment 101 and the other distal end of the thermal energy conductor 105 extending into the second compartment 102.

Figure 4A:
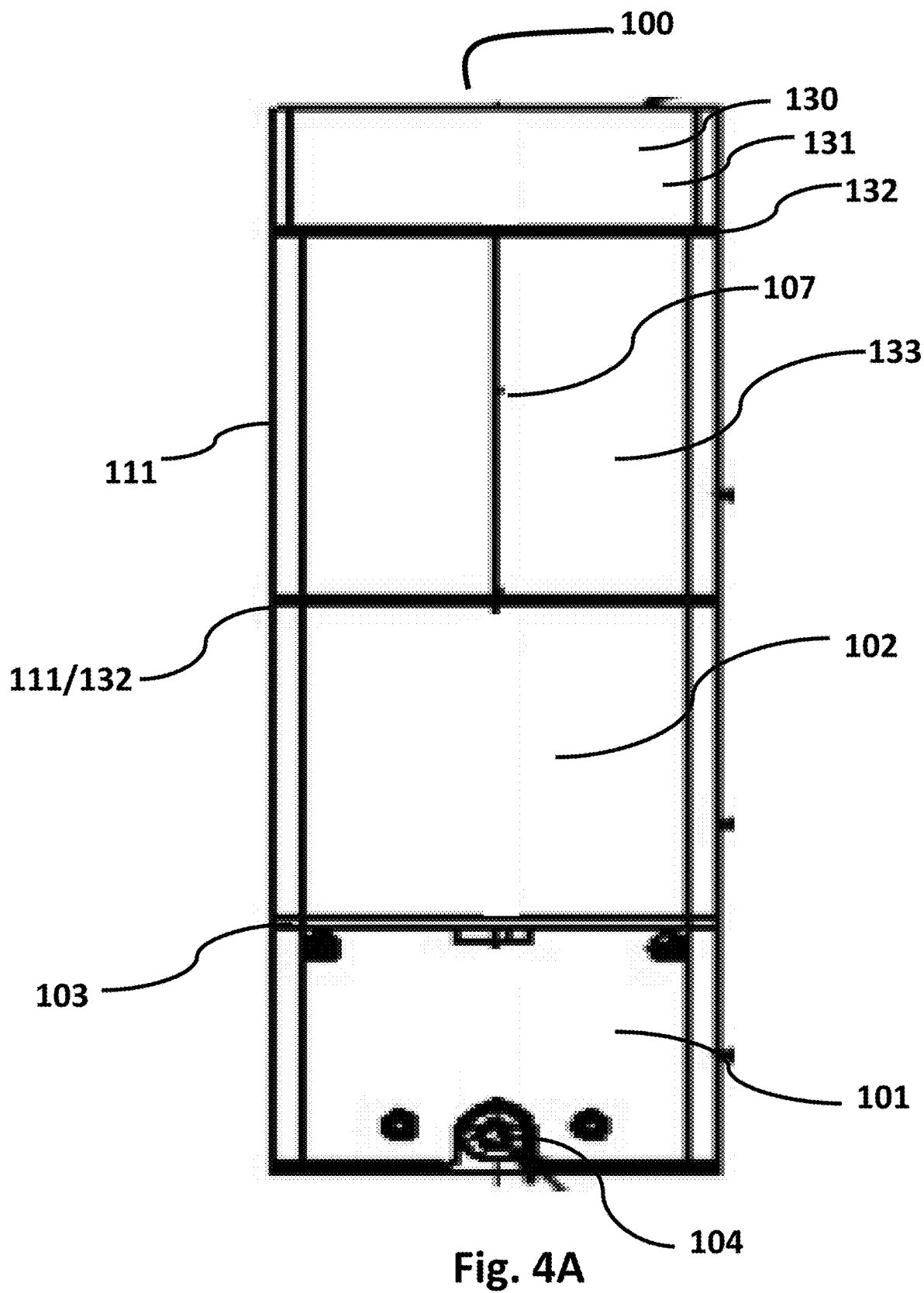
FIGS. 4A and 4B depict another device for generating hydrogen gas according to some embodiments of the present disclosure.
Figure 4B:
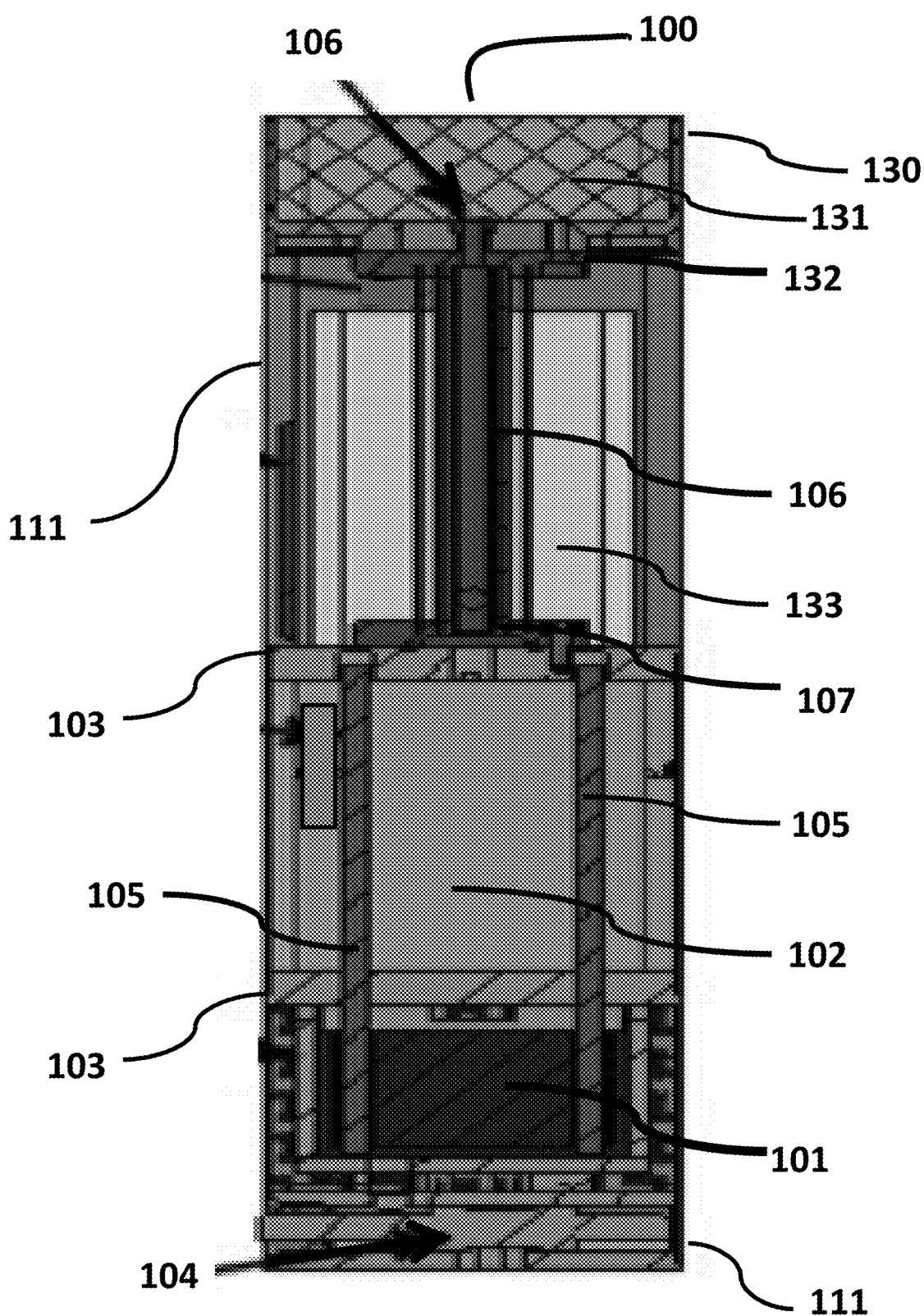

FIGS. 4A and 4B depict a device for generating hydrogen gas according to various embodiments as described in the above Summary and Detailed Description and herein below. More specifically, FIGS. 4A and 4B depict a device 100 having first 101, second 102 and third 130 compartments, with the second compartment 102 positioned between the first compartment 101 and a third 130 compartments. The first 101, second 102 and third 130 compartments have walls 111. A separator 103 separates the first 101 and second 102 compartments. The separator 103 is in thermal contact with the first 101 and second 102 compartments. A partition 132 separates the second 102 and third 130 compartments. The first compartment 101 contains a pyrotechnic composition (not depicted); the second compartment 102 contains a metal hydride (not depicted); and the third compartment 130 contains a balloon 131. An outlet 107 for the egress of hydrogen gas generated in the second compartment 102 interconnects the second compartment 102 with the balloon 131. Furthermore, a heat exchanger 106 is interconnected to the outlet 107. The heat exchanger 106 cools the hydrogen gas exiting the second compartment 102 through outlet 107. An igniter 104 is interconnected with the first compartment 101. The igniter 104 initiates reaction of the pyrotechnic composition.

FIG. 4B further depicts intermediate thermal energy conductors 105 and a data collection module 133. The intermediate thermal energy conductors 105 traverse through the separator 103 with one distal end of the thermal energy conductors 105 extending into the first compartment 101 and the other distal end of the thermal energy conductors 105 extending into the second compartment 102. The data collection module 133 is configured to collect data for determining one or both of meteorological and terrestrial activities or conditions.

Figure 5:
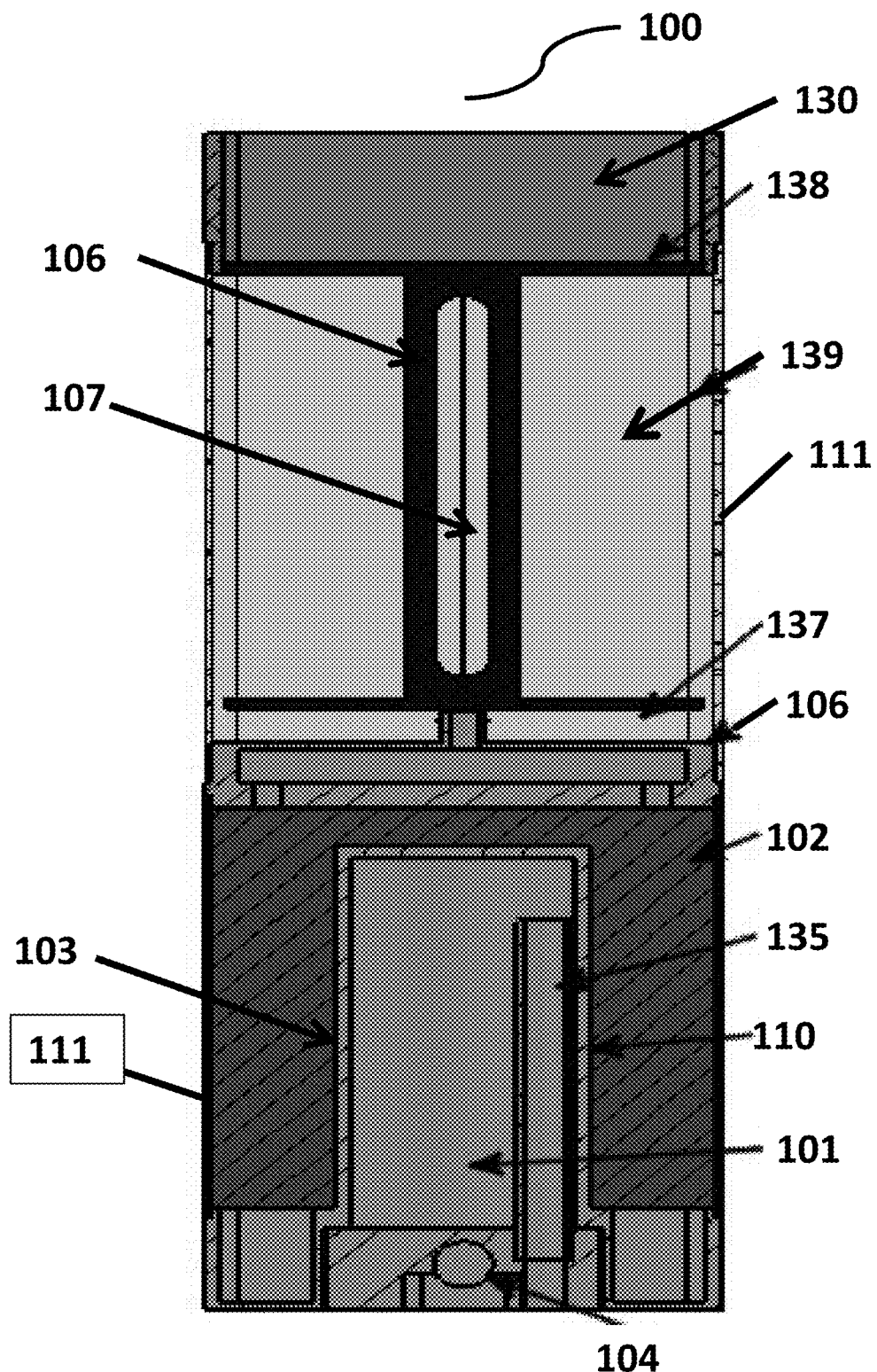
FIG. 5 depicts yet another device for generating hydrogen gas according to some embodiments of the present disclosure.

FIG. 5 depicts a device for generating hydrogen gas according to various embodiments as described in the above Summary and Detailed Description and herein below. More specifically, FIG. 5 depicts a device 100 having first compartment 101 and second compartment 102, with the second compartment 102 encased in the first compartment 101. Positioned between a third compartment 130 and the first compartment 101 is a data collection module compartment 139. The first compartment 101, the third compartment 130, and the data collection module compartment 139 have walls 111. Separator 103 separates the first 101 and second 102 compartments. The separator 103 is in thermal contact with the first 101 and second 102 compartments. A partition 137 separates the second 102 compartment and the data collection module compartment 139, and a barrier 138 separates the data collection module compartment 139 and third compartment 130. The first compartment contains a pyrotechnic composition (not depicted) and vent 135; the second compartment 102 contains a metal hydride (not depicted); the third compartment 130 contains a balloon 131 (not depicted); and the data collection module compartment 139 contains a data collection module 133 (not depicted). An outlet 107 for the egress of hydrogen gas generated in the second compartment 102 interconnects the second compartment 102 with the balloon 131. Furthermore, a heat exchanger 106 is interconnected to the outlet 107. The heat exchanger 106 cools the hydrogen gas exiting the second compartment 102 through outlet 107. An igniter 104 is interconnected with the first compartment 101. The igniter 104 initiates reaction of the pyrotechnic composition.

EXAMPLES

The thermite reaction produces a large amount of heat in a short period of time from a small volume of material. In an example implementation using 38.5 g of thermite, the thermite reaction releases nearly 152,988 J of energy over a period of about 10 seconds, or 15,299 J/sec.

Further to the volume efficiency of this approach, the hydrogen source, a metal hydride, is a very volume efficient source of hydrogen gas ($H_2$). A test filling of a balloon was performed. The final balloon volume was measured at approximately 42 liters at the conclusion of the test. Given ambient pressure (0.82 atm) and temperature (300 degrees Kelvin or 27 degrees Celsius), this corresponded to 1.40 mole of hydrogen being produced. Working from the reactions presented above, the 30 g of $LiAlH_4$ should have yielded 1.18 moles of hydrogen if only the first two reactions went to completion (which is the design criterion), or 1.57 moles if all three reactions went to completion. The measured value of 1.40 moles is right between these values and right where it is desired to be. This result means that the reactor is easily completing the required first two decomposition steps, and via the third decomposition step is generating additional hydrogen beyond that required in the design. This would be expected given the temperature data gathered during the experiment, which showed temperature climbing above that required to initiate the third decomposition step.

A number of variations and modifications of the disclosure can be used. It would be possible to provide for some features of the disclosure without providing others.

The present disclosure, in various aspects, embodiments, and configurations, includes components, methods, processes, systems and/or apparatus substantially as depicted and described herein, including various aspects, embodiments, configurations, sub-combinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspect, embodiment, or configuration. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A process, comprising:
    initiating, in a first compartment, reaction of a pyrotechnic composition consisting essentially of a powdered metal oxide and a powder metal to release thermal energy,
    transferring at least some of the released thermal energy from the first compartment to a second compartment containing a composition consisting essentially of one or more metal hydrides; and
    decomposing, with the thermal energy transferred to the second compartment, at least some of the one or more metal hydrides to release hydrogen gas.

2. The process of claim 1, wherein the metal hydride may be selected from the group consisting of lithium aluminum hydride ($LiAlH_4$), sodium aluminum hydride ($NaAlH_4$), potassium aluminum hydride ($KAlH_4$), lithium borohydride ($LiBH_4$), sodium borohydride ($NaBH_4$), potassium borohydride ($KBH_4$), lithium hydride (LiH); sodium hydride (NaH), potassium hydride (KH), magnesium hydride ($MgH_2$), calcium hydride ($CaH_2$) and mixtures thereof, wherein the powdered metal oxide is selected from the group consisting essentially of iron (III) oxide ($Fe_2O_3$), iron (II,III) oxide ($Fe_3O_4$), copper (I) oxide ($Cu_2O$), copper (II) oxide (CuO), tin (IV) oxide ($SnO_2$), lead (IV) oxide ($PbO_2$), manganese (IV) oxide ($MnO_2$), manganese (III) oxide ($Mn_2O_3$), chromium (III) oxide ($Cr_2O_3$), cobalt (II) oxide (CoO), nickel (II) oxide (NiO), and vanadium (V) oxide ($V_2O_5$), and mixtures thereof, and wherein the powder metal is selected from the group consisting essentially of aluminum (Al), magnesium (Mg), zinc (Zn), and mixtures thereof.

3. The process of claim 1, wherein the initiating step further comprises:
    contacting the pyrotechnic composition with an igniter which is initiated by one or more of a spark, heat, flame, and friction.

4. The process of claim 1, wherein the transferring of the released thermal energy from the first compartment to the second compartment is through one or both of a metal and a metal-based compound.

5. The process of claim 1, wherein the transferring of the released thermal energy from the first compartment to a second compartment further comprises controlling the amount of thermal energy transferred per unit of time.

6. The process of claim 1, further comprising:
    cooling the released hydrogen gas.

7. The process of claim 1, wherein the first compartment has a first compartment volume and the second compartment has a second compartment volume and wherein the sum of the first compartment volume and the second compartment volume comprises a total volume.

8. The process of claim 4, wherein the decomposing step further comprises:
    releasing, in no more than about 60 seconds, about 6.2 moles of hydrogen gas per liter of the total volume.

9. The process of claim 4, wherein the decomposing step further comprises:
    releasing, in no more than about 60 seconds, more than about 7.3 moles of hydrogen gas per liter of the total volume.

10. The process of claim 4, wherein the decomposing step further comprises:
    releasing, in no more than about 60 seconds, about 9.7 moles of hydrogen gas per liter of the total volume.

* * * * *